United States Patent [19]

Leaper et al.

[11] Patent Number: 4,987,355
[45] Date of Patent: Jan. 22, 1991

[54] SELF-SYNCHRONIZING SERVO CONTROL SYSTEM AND SERVO DATA CODE FOR HIGH DENSITY DISK DRIVES

[75] Inventors: Mark W. E. Leaper; Robert Y. Noguchi, both of Colorado Springs; Randall L. Sandusky, Woodland Park, all of Colo.

[73] Assignee: Digital Equipment Corporation, Maynard, Mass.

[21] Appl. No.: 446,051

[22] Filed: Dec. 5, 1989

[51] Int. Cl.5 .......................................... G05B 13/00
[52] U.S. Cl. .................................. 318/561; 307/351; 360/77.07
[58] Field of Search ...................... 318/561; 360/77.07; 307/351

[56] References Cited

U.S. PATENT DOCUMENTS

| | | | |
|---|---|---|---|
| 4,238,809 | 12/1980 | Fujiki et al. | 360/131 |
| 4,530,019 | 7/1985 | Penniman | 360/77.08 |
| 4,530,020 | 7/1985 | Sutton | 360/77.04 |
| 4,602,304 | 7/1986 | Fultz | 360/77.05 |
| 4,631,606 | 12/1986 | Sugaya | 360/77.08 |
| 4,669,003 | 5/1987 | Bell et al. | 360/77.05 |
| 4,682,253 | 7/1987 | Leslie | 360/77.07 |
| 4,698,523 | 10/1987 | Gershon et al. | 307/351 |
| 4,823,212 | 4/1989 | Knowles et al. | 360/77.08 |
| 4,825,310 | 4/1989 | Song | 360/77.08 |

Primary Examiner—William M. Shoop, Jr.
Assistant Examiner—Saul M. Bergmann
Attorney, Agent, or Firm—Neuman, Williams, Anderson & Olson

[57] ABSTRACT

A self-synchronizing servo control system and its associated servo data code for use in a high-density disk memory is disclosed. The servo data is formatted into a sync/index zone and a data zone. Sync and index di-bits are written only in the sync/index zone, while only servo data position di-bits are written in the data zone. Elimination of the sync and code di-bits used in prior art methods removes all requirements for radial phase coherence during the writing process, and increases the servo sample frequency. The new servo data code also reduces the intersymbol interference seen by adjacent pulses. The associated configuration of the servo control system is also disclosed.

12 Claims, 7 Drawing Sheets

Fig. 1A (PRIOR ART)

Fig. 1B TRACK 0

Fig. 1C TRACK 1

Fig. 1D TRACK 2

Fig. 1E TRACK 3

Fig. 2A

Fig. 2B  TRACK -1

Fig. 2C  TRACK 0

Fig. 2D  TRACK 1

Fig. 2E  TRACK 2

SELF-SYNCHRONIZING SERVO CONTROL SYSTEM AND SERVO DATA CODE FOR HIGH DENSITY DISK DRIVES

FIELD OF THE INVENTION

The present invention relates to a self-synchronizing servo control system and servo data codes for high density disk drives, and more particularly to an improved servo data code which eliminates degradation in servo performance caused by radial phase incoherence and which also reduces adjacent pulse interaction and the methods and circuitry for implementing the self-synchronizing servo control system.

BACKGROUND OF THE INVENTION

Information storage is a necessary component of all computer systems. Typically, digital information is stored on various recording media either optically or magnetically. In the magnetic storage of digital information, the recording media includes tape, hard disk, and floppy disk.

Hard disk systems typically consist of one or more disks which are mounted on and rotated by a common spindle. Each disk contains a plurality of concentric tracks wherein serial data can be magnetically recorded for later recovery by a transducer or head positioned with respect to the desired track. Since information is typically recorded on both surfaces of each disk, each disk surface has a corresponding head, with all the heads being mounted on a common movable carriage. Thus, to obtain access to the recorded information, means must be provided for accurately positioning the carriage, and therefore the heads, over the track which contains the desired information.

One system for head positioning includes one or more disks as described above, where one surface of one disk is dedicated solely for the purpose of providing position and timing information for the servo control system of the disk drive. This surface contains a formatted servo data code which is electronically recovered by a servo head, mounted to the same carriage as the remaining data head(s). Using the dedicated servo surface and servo data code recorded thereon, the servo control system of the disk drive can move the data heads to a specific location on the data disks to write or read the desired information.

Due to the dramatic increase in data storage densities over the last few years, the need for a more efficient and fault-tolerant servo data code has become evident. Higher track densities (TPI) and seek velocities have made it necessary to increase the servo sample rate to maintain an acceptable level of seek performance. It has also been shown that higher bit densities (BPI) can have an adverse effect on the servo performance by altering the recorded servo information through adjacent pulse interaction and radial phase incoherence.

As track densities, data densities, and seek velocities have increased over the years, so have the methods and mechanisms for recovering dedicated servo information. As a result, a variety of servo data codes and servo control systems have been proposed.

One commonly used servo data code is described by di-bits which are written in multiple frames on each track of the servo surface. A di-bit is represented by a positive transition immediately followed by a negative transition. A frame is an arcuate portion of the servo surface spanning several tracks on which is recorded a sync di-bit, a code di-bit, and two or more additional di-bits. The sync di-bit is used to provide sync and timing information for the servo control system. The code di-bit is used to encode index and guard band patterns on specific zones on the disk. The additional di-bits in each frame of servo data are used to provide head position and velocity information used by the servo control system for positioning the data heads.

In such a system, sync and code di-bits are overwritten to achieve a constant amplitude from track to track. This overwriting process occurs as the writing head moves radially across the disk. Any circumferential movement of the writing head causes phase incoherence in the signal being written, producing signal degradation. This distortion ultimately affects the performance of the servo system. In addition, the presence of the sync and code di-bits and the sequence in which the di-bits are written in the prior art servo data codes result in asymmetrical interference patterns. As data densities increase, these phenomena becomes more pronounced due to narrower pulse widths and higher writing frequencies.

SUMMARY OF THE INVENTION

The present invention is a self-synchronizing servo system and a new servo data code including the method for recovering dedicated servo information from a high density disk storage device.

The servo data code and corresponding method of data recovery embodied in this invention, eliminates the degradation in servo performance caused by radial phase incoherence by eliminating the need for sync and code dibits in the data zone. Removal of the sync and code dibits also produces a 33% increase in the servo sample rate due to the additional number of position di-bits that can be recorded on each track of servo data, having the effect of improved seek performance.

The present invention uses the most optimum intersymbol interference pattern and thereby eliminates or reduces pulse interaction that occurs between adjacent pulses. The most optimum interference pattern possible is achieved when di-bits are written in a A-B-C-D-A-B-C-D sequence on the servo tracks as embodied in this invention. In this optimum interference pattern, each di-bit sees the same amount of intersymbol interference as the other di-bits.

The invention is also more fault tolerant than prior art methods, due to the removal of index encoding in the data zone and through the use of a dedicated sync zone for phase locked loop (PLL) acquisition.

In the present invention, index patterns are not encoded in the data zone, thus eliminating the possibility of index faults due to media defects or other sources of signal degradation. The invention also provides predictable PLL acquisition through the use of a dedicated sync zone. Since it is not necessary to discriminate between pulses as with prior art methods, PLL acquisition is rapid and reliable.

DESCRIPTION OF THE PREFERRED EMBODIMENT

Figure 1A:
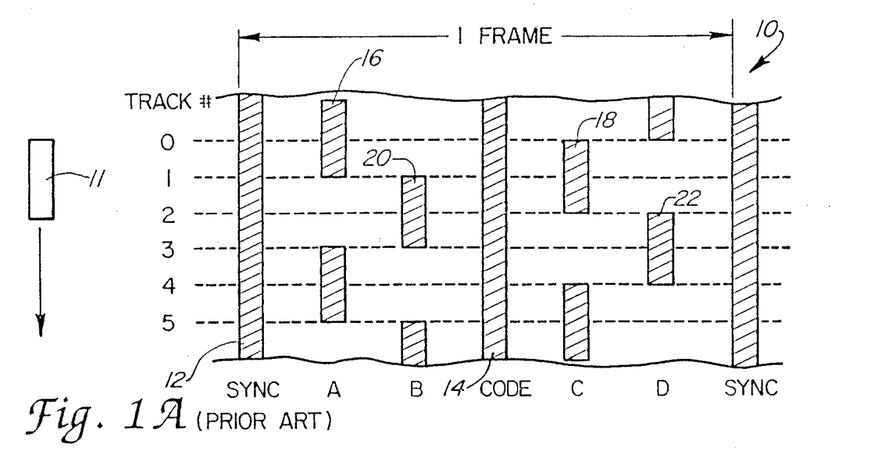
FIG. 1A illustrates the servo data code used in the prior art.
Figures 1B, 1C:
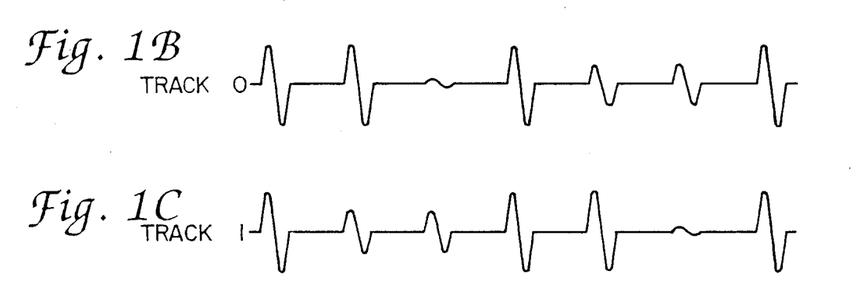
FIGS. 1B–1E illustrate the electronic representation of the servo readback signal of the servo data code illustrated in FIG. 1A.
Figure 1D:
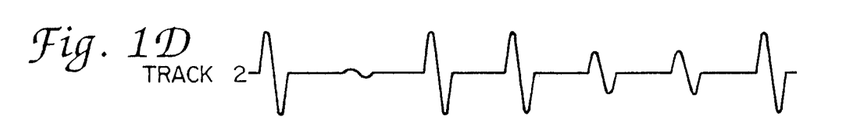
Figure 1E:
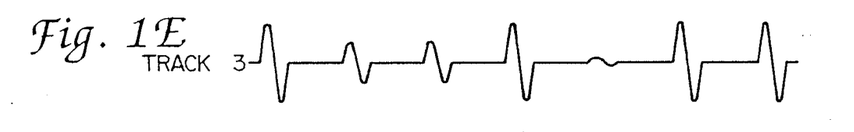

FIG. 1A is a pictorial representation of a servo data code commonly used in prior art disk storage devices. The flux transition zones are shown for a frame 10 of servo data which has been written on track numbers 0–5 of a typical servo disk. A typical track of servo data contains a fixed number of frames of servo data which have been written circumferentially at a particular radial location on the disk. A fixed number of tracks of servo data are written along the radius of a typical servo disk. A servo head 11 moves radially across the disk to read the servo data recorded on successive tracks.

In prior art devices, it is common to use two di-bits in each frame of servo data solely for the purpose of pattern synchronization and encoding. A sync di-bit 12, shown in FIG. 1A, is written radially across the disk in a contiguous manner so that pulses of constant amplitude are present on each track. The sync di-bit 12 is used to provide sync information for the Phase-Locked-Loop (PLL) of the servo system from which all other disk timing signals are generated. A code di-bit 14 of FIG. 1 is also written radially across the disk and is used to encode index and guard-band patterns in specific zones on the disk. The method used to record the sync di-bit 12 and the code di-bit 14 in this manner is known as overwriting and requires very good radial phase coherence to obtain good signal reproduction.

The remaining di-bits in each frame of servo data provide the critical head position and velocity information needed by the servo system to move the data heads to the proper location on the data disk. These dibits are written on adjacent tracks in the sequence of an A di-bit 16, a C di-bit 18, a B di-bit 20, and a D di-bit 22 on tracks 0 through 3 respectively. This pattern continues for the remaining tracks so that quadrature position information is available as the head moves across the servo tracks.

FIGS. 1B-1E show the electronic representation of the servo readback signal as the servo head is positioned over track numbers 0 through 3, respectively. For each of the six flux transition zones in a frame of servo data, a di-bit pulse is reconstructed as the servo head moves through the zone, its amplitude being dependent on the position of the head relative to the center of the zone.

Figure 2A:
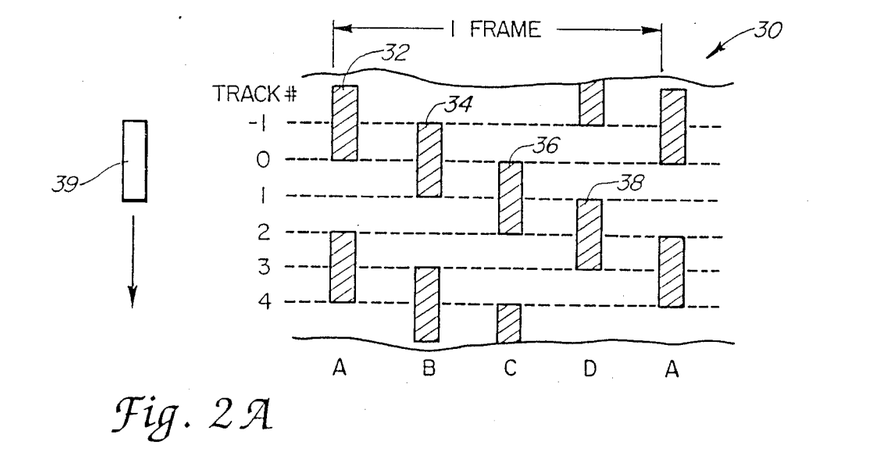
FIG. 2A illustrates the servo data code of the present invention.
Figure 2B:
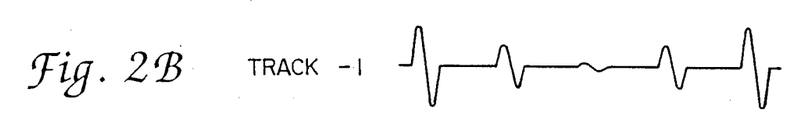
FIGS. 2B-2E illustrates the electronic representation of the servo readback signal of the servo data code illustrated in FIG. 2A.
Figure 2C:
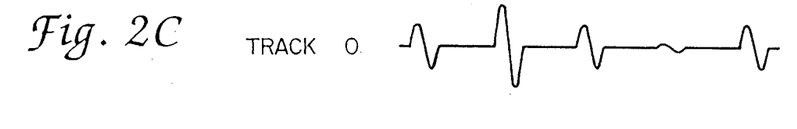
Figure 2D:
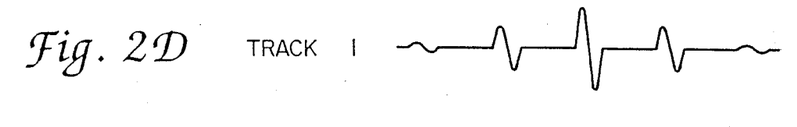
Figure 2E:
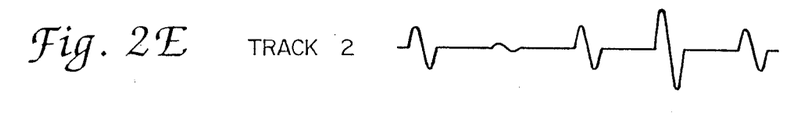

Referring to FIG. 2A, a pictorial representation of the servo data code of the invention is shown in a similar manner as the prior art code of FIG. 1A. Unlike prior art codes, this servo data code does not have the sync di-bit 12 or the code di-bit 14 commonly used to provide synchronization and timing information. A frame 30 of servo data contains only four di-bits which provide position and velocity information for the servo system of the disk drive. Thus, the efficiency of the servo data code is increased by 33% by eliminating the overhead of the sync di-bit 12 and the code di-bit 14 required by the prior art code. For reasons which are described herein, the position di-bits are written on adjacent tracks in the sequence of an A di-bit 32, a B di-bit 34, a C di-bit 36, and a D di-bit 38 on tracks -1 through 2 respectively. This pattern continues on the remaining tracks in a similar fashion. This particular pattern yields the most optimum interference pattern and reduces adjacent pulse interaction. FIGS. 2B-2E show the electronic representation of the servo readback signal as the servo head 39 is positioned over track numbers −1 through 2 respectively.

Since there are no sync and code di-bits available to provide synchronization and timing information, the servo system must be self-synchronizing, extracting the necessary timing information from the servo data code itself. The servo data code and the method of servo data recovery described by this invention provides the means to accomplish this.

Figure 3:
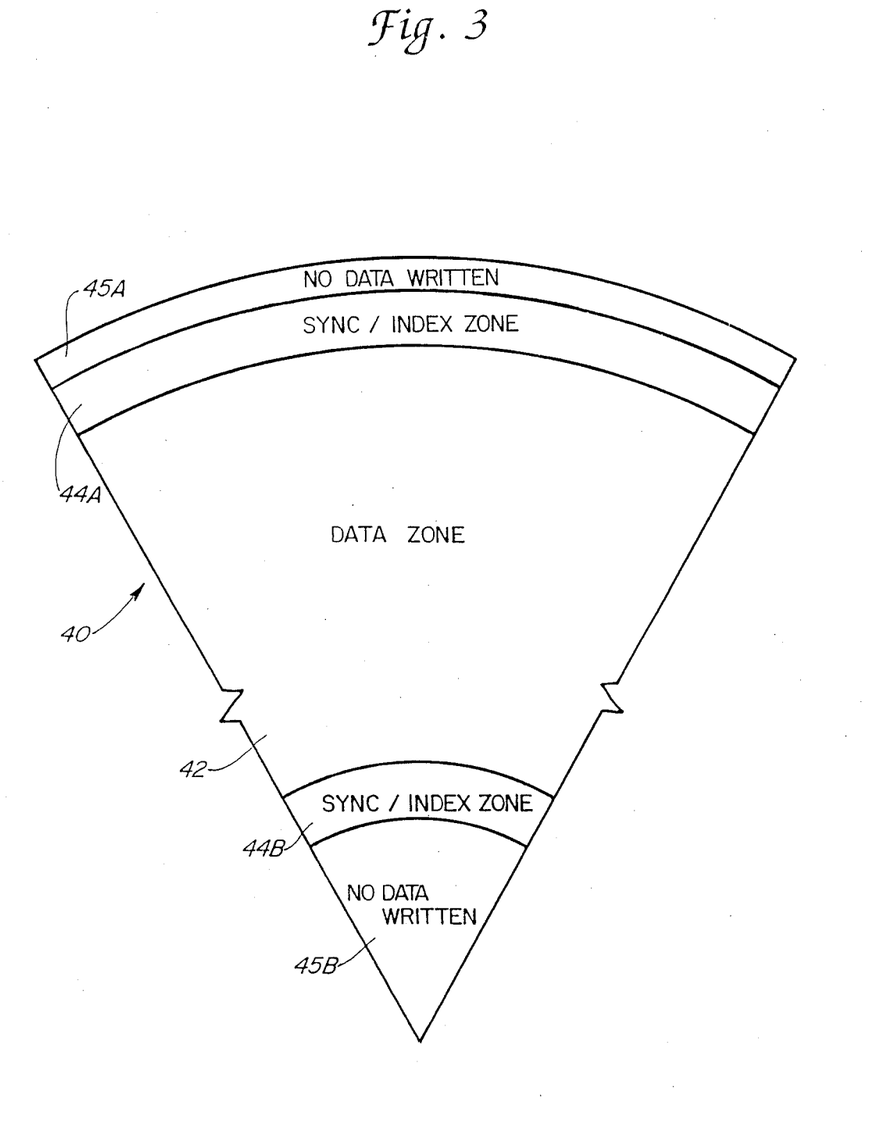
FIG. 3 illustrates a section of a servo disk formatted in a preferred embodiment.

FIG. 3 shows a section 40 of a servo disk which has been formatted in a manner required by the invention for self-synchronization. A data zone 42 is the region in which the servo data code of FIG. 2 is written and is radially located in the same zone which is occupied by the data heads of the remaining disks. To enable synchronization and index detection to occur, two sync/index zones 44 A and 44 B are provided as shown in FIG. 3. The dedicated sync/index zones 44A and 44B provide predictable phase locked loop acquisition since it is not necessary to discriminate between pulses. In a preferred embodiment, an outer sync index zone 44A contains more tracks than an inner sync/index zone 44B. The inner sync index zone 44B contains only a few tracks. It is within the scope of the present invention to have only a single sync/index zone or to have more than two sync/index zones. There are also two no-data zones 45A and 45B in which no data is written.

Figure 4A:
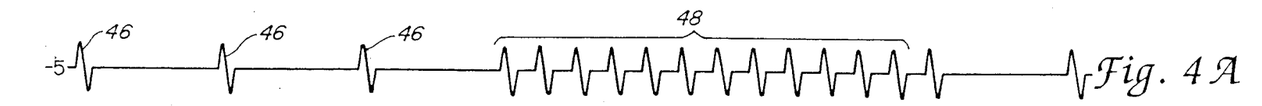
FIGS. 4B-4H illustrate the electronic representation of the servo readback signal of the servo data code used to perform synchronization and index encoding as required by the invention.
Figure 4B:
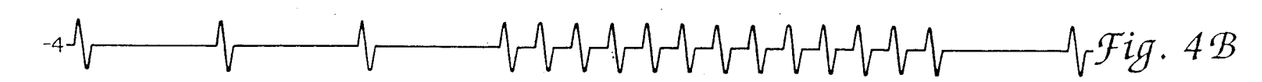
Figure 4C:
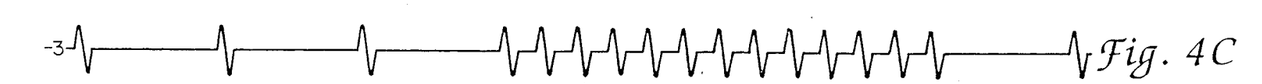
Figure 4D:
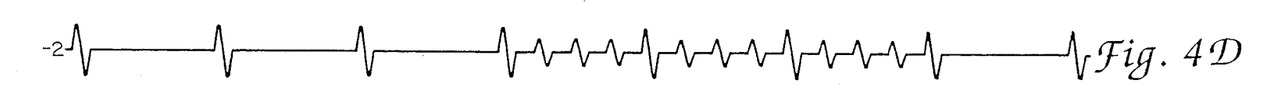
Figure 4E:
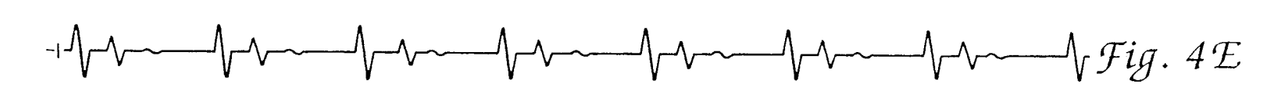
Figure 4F:
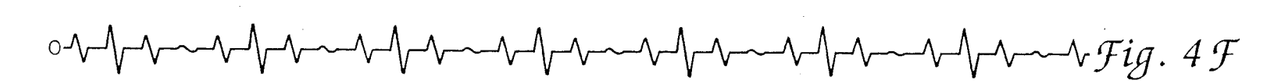
Figure 4G:
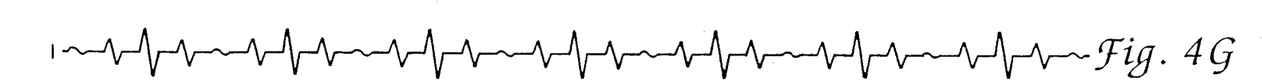
Figure 4H:
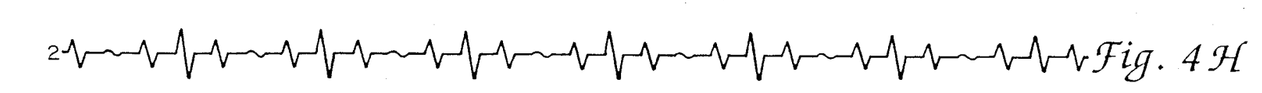

FIG. 4A shows the electronic representation of the sync/index readback signal as the servo head is positioned over the sync/index zone 44A or B. This pattern is characterized by a single di-bit 46 per frame of servo data, i.e the "A" di-bit 32 of FIG. 2. Index information is provided by a di-bit burst 48 of twelve consecutive di-bits, as shown in FIG. 4A, which occurs only once per revolution. The number of di-bits in the di-bit burst 48 can vary depending on design requirements. As a minimum, this number must be one greater than the maximum number of di-bits which can be detected in one frame of servo data at any location on the disk.

The remaining tracks shown in FIG. 4B through 4H illustrate the electronic representation of the servo readback signal of tracks −4 through 2. Tracks −5 through −1 make up the sync/index zone 44A. Tracks 0 through 2 illustrate the start of the data zone 42. Tracks −2 and −1 do not contain the di-bit burst 48 and ar buffer tracks whose number can vary and whose location occurs just before the start of the data zone 42. In a preferred embodiment, position di-bits 34, 36, and 38 are only written in the data zone 42 beginning at track number 0. It is within the scope of this invention, however, to write the same di-bits on the last several tracks of the sync/index zone 44 to enable the servo control system to position the heads within the zone.

It is in the sync/index zone 44A or 44B that the servo phase-locked loop (PLL) achieves frequency and phase lock. Since there is only one of the single di-bits 46 in each frame of servo data, it is not necessary to discriminate between adjacent di-bits, and PLL lock is easily achieved. Once PLL lock has occurred, however, the integrity of the lock condition must be maintained regardless of the number of di-bits seen in each frame of servo data, which changes as the servo head moves through the index and data zones. It is the self-synchronization feature of this invention which maintains the integrity of PLL lock through the use of dual mode frequency and phase detectors which are described below.

In a system using the two sync/index zones 44A and 44B, shown in FIG. 3, better servo control is achieved. If for some reason the servo control system loses lock, the servo data head 39 moves to the nearest sync/index zone 44A or 44B to reestablish frequency and phase lock. This provides a quicker and more efficient servo control system by reducing the travel time of the servo head 39 when seeking the sync/index zone 44A or 44B.

Figure 5:
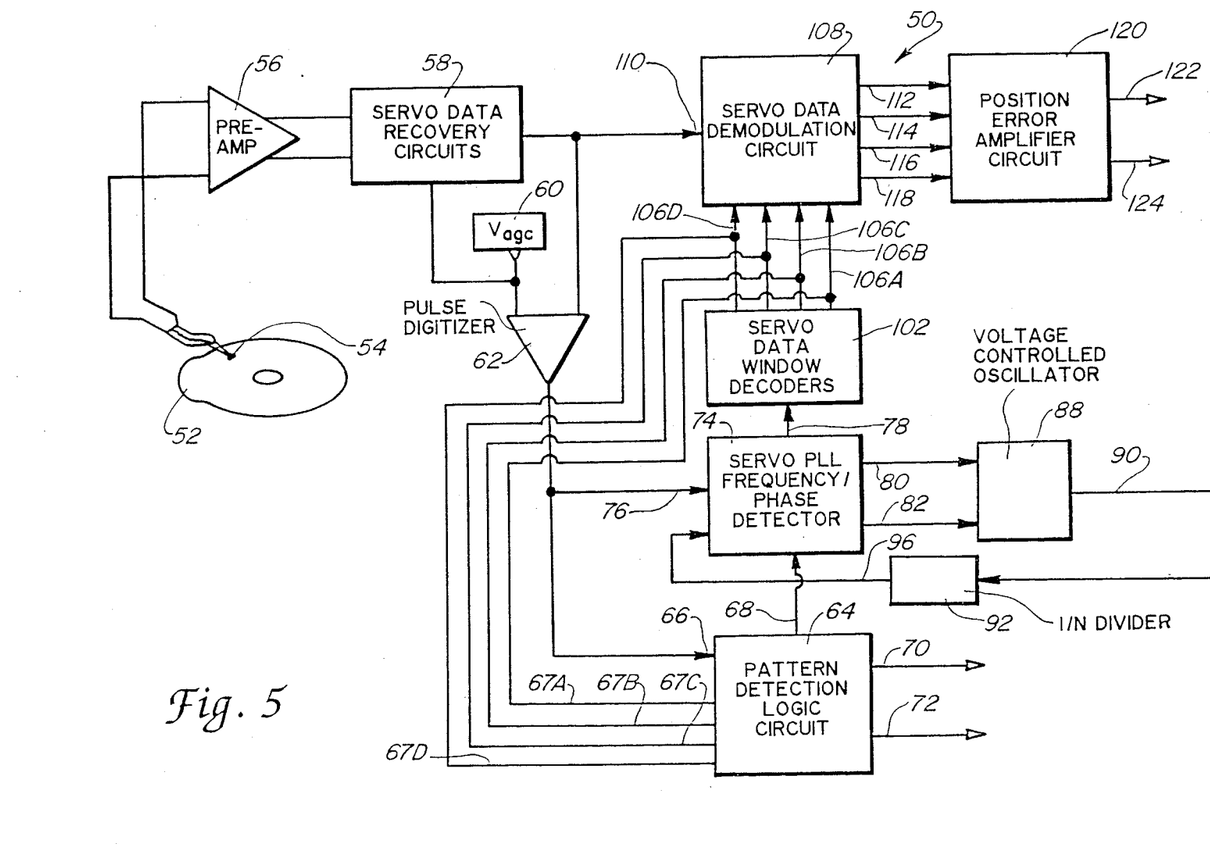
FIG. 5 is a block diagram of the invention in accordance with its preferred embodiment in a servo system.

Referring now to FIG. 5, a block diagram of the self-synchronizing servo system 50 is shown. The signal recovered from a servo disk 52 by a servo head 54 is preamplified by a preamp 56 and further processed by a bank of servo data recovery circuits 58 to achieve a constant amplitude specified by reference voltage Vagc 60, while removing any unwanted frequency components, as is well known. A pulse digitizer 62, the operation of which is well known by those skilled in the art, is connected to the output of the servo data recovery circuits 58 to convert the analog servo data signal to a digital servo pulse signal having a frequency corresponding to the analog servo data signal. The digital servo pulse signal is applied to a pattern detection logic circuit 64 via a digitized servo data input line 66. Four gating signals are applied as inputs to the pattern detection logic circuit 64, via a first gating input line 67A, a second gating input line 67B, a third gating input line 67C, and a fourth gating input line 67D.

The pattern detection logic circuit 64 has a PLL lock/unlock output signal on PLL lock/unlock line 68, a data zone output signal on data zone line 70, and a pattern detection logic output signal on pattern detection logic line 72. The signals present at these three lines are generated by the pattern detection logic circuit 64 in response to the digitized servo data and four di-bit gating signals on lines 67A, B, C, and D to be described later in greater detail. The signal at the data zone line 70 is a positive value or a 1 if the servo data head 54 is in the data zone and a negative value or a zero if outside the data zone. The signal at the pattern detection logic line 72 is a logic pulse or index pulse used by the selfsynchronizing servo system 50 when writing information on data disks. The pulse indicates that the start of data is imminent, and occurs once per revolution.

The digitized servo data is also used as an input to a servo PLL frequency/phase detector 74 via a frequency/phase detector input line 76. The servo PLL frequency/phase detector 74 has three outputs, a clock output on clock line 78, an increase frequency output on increase frequency line 80, and a decrease frequency output on decrease frequency line 82. The clock output on line 78 is a timing signal which is a multiple of the frequency of the di-bit pulses. The increase frequency output on line 80 and the decrease frequency output on line 82 are used as inputs respectively to adjust the frequency of a voltage controlled oscillator (VCO) 88 whose output frequency at VCO frequency line 90 is divided by a 1/N divider 92. The voltage controlled oscillator frequency is divided by N and is applied as a feedback signal on line 96 to the servo PLL frequency/phase detector 74. A signal on line 68 indicating whether the phase locked loop is locked or unlocked is used as an input signal to servo PLL frequency/phase detector 74. Operating under these conditions, the servo PLL frequency/phase detector 74 locks the phase locked loop when the servo head 54 is in the sync/index zone 44A or 44B of the servo data disk 52 and also maintains the lock of the phase locked loop as the servo head 54 moves through the data zone 42.

The clock output on line 78 is used by servo data window decoders 102, as well known by those skilled in the art, to produce gating signals for the A di-bit 32, the B di-bit 34, the C di-bit 36, and the D di-bit 38 shown in FIG. 2 to indicate the time domain position of these signals with respect to one another. These gating signals are output from the servo data window decoders 102 at a first gating line 106A, a second gating line 106B, a third gating line 106C, and a fourth gating line 106D. These gating signals are used by the pattern detection logic circuit 64 of the present invention and a servo data demodulation circuit 108 well known by skilled practitioners of this art. The gating signals are applied to peak detectors located in the servo data demodulation circuit 108 to turn the peak detectors on and off at the correct time to correspond to the analog servo data received by the servo data demodulation circuit 108 via a demodulation circuit input line 110. In response to the gating signals, the servo data demodulation circuit 108 generates a peak detected signal on lines 112, 114, 116 and 118 corresponding respectively to each of the A, B, C, and D di-bits. These peak detected signals are then used by a position error amplifier circuit 120, which is well known, to develop an A–C quadrature position error signal on line 122 and a B–D quadrature position error signal on line 124. These two signals on lines 122 and 124 control the location of the read/write data head as is well known in the art.

Figure 6:
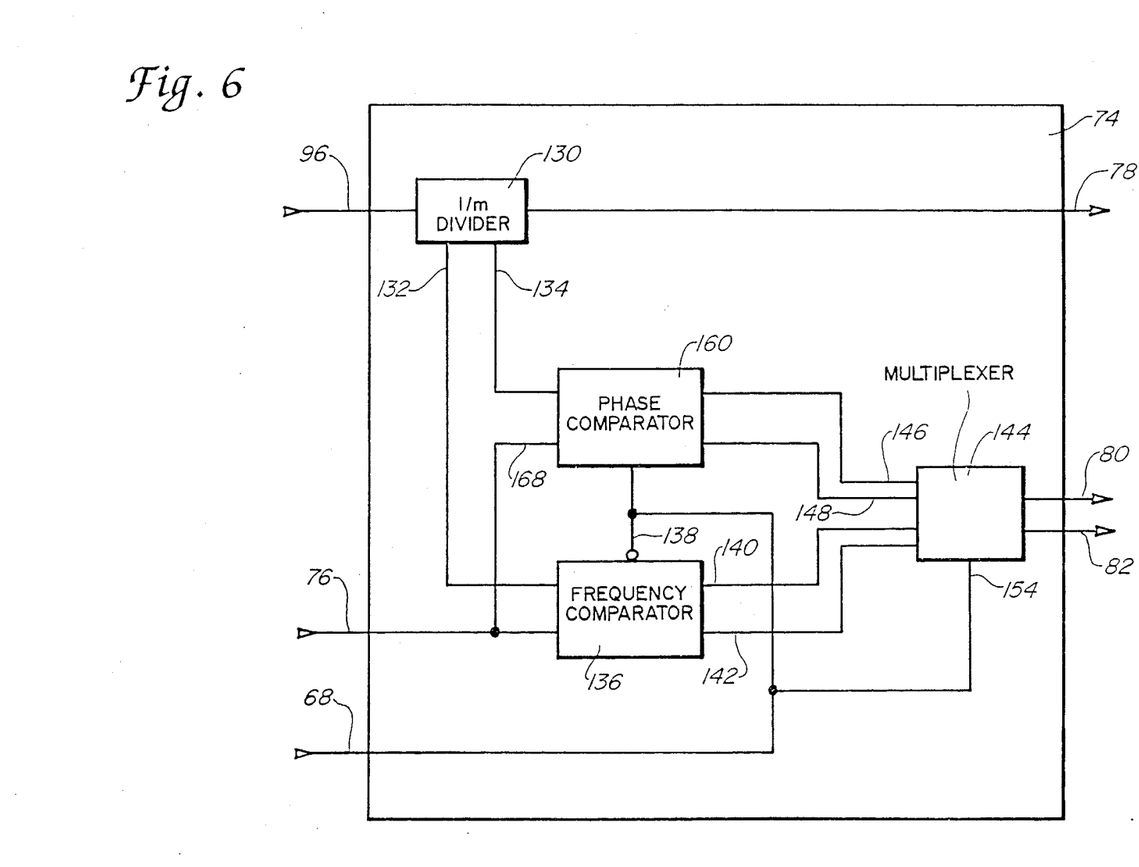
FIG. 6 is a detailed block diagram of a servo phase locked loop frequency/phase detector.

FIG. 6 shows the servo PLL frequency/phase detector 74 of the present invention which is used to control the frequency of the servo control system. The voltage controlled oscillator frequency divided by N is applied via line 96 and divided by a 1/m divider 130. The 1/m divider generates a final frequency at an f1 line 132 which is equal to the frame frequency of the frame 30 of the servo data code. In addition, the 1/m divider generates two sub-frequencies at an f2 line 134 and the clock line 78. The frequency of the f2 output on f2 line 134 determines the number of phase comparisons which will be made by the phase comparator 160 in one frame of servo data. In the preferred embodiment, the frequency of the f2 output on f2 line 134 is two times the frequency of the f1 output on f1 line 132, however, it is within the scope of this invention for the f2 output to be another multiple of f1 as might be required by the application.

In a PLL unlock condition, as would occur when the disk drive is first turned on or when a fault is detected, the servo head must be located in the sync/index zone 44A or 44B for lock to occur. In FIG. 6, an unlock condition causes a frequency comparator 136 of the PLL to be enabled by the PLL lock/unlock signal at line 68 so that the PLL locks to the "A" di-bit pattern present in the sync zone. The frequency comparator 136 receives the PLL lock/unlock signal at a frequency comparator lock/unlock input line 138.

The frequency comparator 136 has a frequency comparator increase frequency output at line 140 and a frequency comparator decrease frequency output at line 142. When the frequency comparator 136 is enabled by the PLL lock/unlock signal, a multiplexer 144 having a first multiplexer input on line 146, a second multiplexer input on line 148, a third multiplexer input on line 140, and a fourth multiplexer input on line 142 is also enabled by the PLL lock/unlock signal at multiplexer select line 154 to choose the two inputs which receive the output signals of the frequency comparator 136. These signals are passed on through the multiplexer 144 at the increase frequency line 80 and the decrease frequency line 82 of the servo PLL frequency phase detector 74.

The frequency comparator 136 derives the increase frequency signal and the decrease frequency signal from the digitized servo data at a frequency comparator digitized servo data input line 76 and the frequency from the f1 line 132 of the 1/m divider 130.

Once lock is achieved, the frequency comparator 136 is disabled, and a phase comparator 160 is enabled by the PLL lock/unlock signal at phase comparator lock/unlock input line 138. The phase comparator 160 generates an increase frequency signal and a decrease frequency signal on line 146 and line 148 respectively. These two outputs are used by the multiplexer 144 once the phase locked loop has been locked. Multiplexer 144 passes these two signals through the multiplexer 144 when the signal at multiplexer select line 154 indicates lock is achieved. The phase comparator 160 operates in response to the digitized servo data at digitized servo data phase comparator input 168 and the signal on the f2 line 134. The phase comparator 160 operates independently of di-bit frequency and thus enables the PLL to remain in lock as the servo head moves through the various zones on the servo disk. Thus, the servo system in this respect is self-synchronizing, extracting its timing information directly from the servo data pattern itself and not from di-bits which have been dedicated for that purpose.

Figure 7:
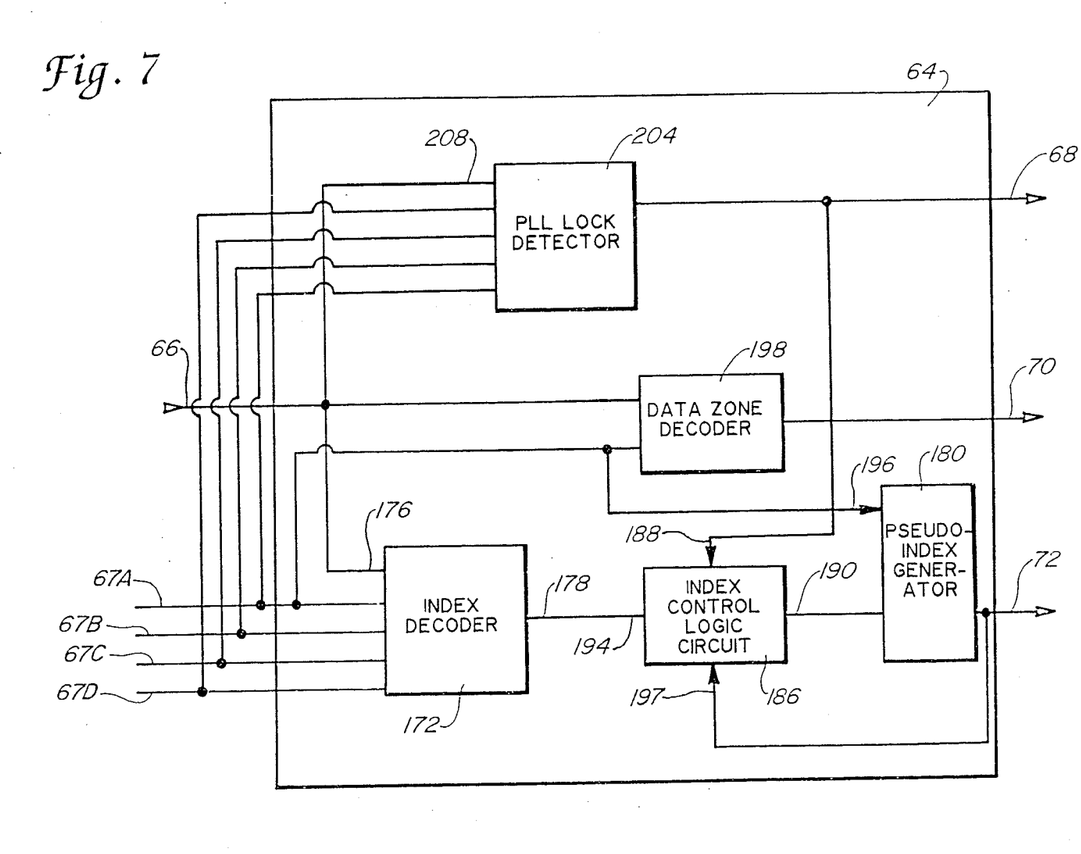
FIG. 7 is a detailed block diagram of a pattern detection logic circuit.

According to the present invention, the pattern detection logic circuit 64 is shown in FIG. 7. To detect the encoded index pattern which has been written in the sync/index zone 44A or 44B of the servo disk, an index decoder 172 is provided. The index decoder 172 receives the A, B, C, and D gating signals generated by the Servo Data Window Decoders 102 at index decoder gating signal input lines 67A, 67B, 67C, and 67D. Index decoder 172 uses these gating signals and the digitized servo data signal at index decoder servo data input line 176 to produce a signal at an index decoder output on line 178 to indicate that the index pattern has been detected. Once the index pattern has been detected, however, it is necessary to generate a pseudo-index pulse to be used when the servo head moves into the data zone 42 where no index patterns are encoded. This is performed by a pseudo-index generator 180 and an associated index control logic circuit 186. In a PLL unlock condition, the PLL lock/unlock signal present at index control logic input line 188 allows the index decoder output at line 178 to initialize the pseudo-index generator 180. A latch within the index control logic circuit 186 is set high to enable or initialize the pseudo-index generator 180. Thus, in this condition an index control logic output at line 190, is the decoded index signal of line 178. Upon initialization, the pseudo-index generator 180 begins counting the number of frames of servo data using the gating signal from the first gating input line 67A which is input at a pseudo-index generator input line 196. This signal is synchronized to the speed of the disk by the servo PLL at the frame frequency of the servo data. Since the number of servo data frames per revolution is predetermined, when the pseudo-index generator 180 reaches the predetermined count, the appropriate index detected control signal is generated at pattern detection logic line 72. Once this has occurred, the index detected signal present at a second index control logic input line 197 inhibits the re-initialization of the pseudo-index generator 180 by any further decoded index pulses. Should the phase locked loop become unlocked, the signal at index control logic input line 188 resets the logic within the index control logic circuit 186 to begin re-initialization of the pseudo-index generator 180. At the same time, the servo head 39 returns to either of the sync/index zones 44A or 44B to read the data within the sync index zone and to lock the phase locked loop. The circuitry to implement the pseudo-index generator 180 and associated index control logic circuit 186 is well known by those skilled in the art and can be configured to count any predetermined number of servo frames as is required by the application.

As long as the PLL remains locked, the pseudo-index pulse remains coincident with the encoded index pulse, providing a reliable indicator of index. This feature effectively removes the need to have an encoded index in the data zone, thus eliminating the need for a code di-bit to be written in each frame of servo data.

To provide an indication of the transition from the data zone 42 to the sync/index zone 44A or 44B and vice-versa, a data zone decoder 198 is provided as shown in FIG. 7. This decoder detects the absence of the B, C, and D di-bits to indicate that the servo head is in the sync/index zone 44A or 44B. The data zone decoder 198 uses the digitized servo data at input line 66 and the presence of the A gating signal from the first gating input 67A. As the servo head moves into the data zone, the decoder will begin to detect additional pulses in each frame of servo data as shown in FIGS. 4E–4H. The data zone is detected when at least one of the B di-bits 34, C di-bits 36, or D di-bits 38 is detected in each frame of servo data for eight consecutive frames. When detected, the data zone decoder 198 generates the appropriate signal at a data zone line 70. Those skilled in the art will appreciate that the data zone decoder 198 can be implemented using well known techniques.

PLL lock detector 204 generates the PLL lock/unlock signal on PLL lock/unlock line 68. This signal is derived from the A, B, C, and D gating signals generated by the servo data window decoders 102 input via lines 67A, 67B, 67C, and 67D and the digitized servo data received at PLL lock detector servo data input line 208. This signal is used by the servo PLL frequency/phase detector 74 as previously described. Several methods exist and are well known for generating a PLL lock/unlock signal, and anyone of those methods can be used.

The foregoing description of the invention has been presented for purposes of illustration and description. It is not intended to limit the invention to the precise forms disclosed, and obviously many modifications and variations are possible in light of the above teachings.

What is claimed is:

1. A servo data disk having a plurality of concentric tracks radially spaced from the center and a servo data code recorded on at least some of said tracks, said servo data disk and code comprising:

at least one sync/index zone having a plurality of tracks divided into a plurality of frames, said servo data code comprising at least one di-bit and a burst of a consecutive plurality of single di-bits, said at least one di-bit being written on each of said tracks within each of said frames of said sync/index zone and said burst being written on each of said tracks in at least one of said frames of said sync/index zone; and at least one data zone having a plurality of tracks divided into a plurality of frames, said servo data code further comprising a plurality of single di-bits, one of said single di-bits being written on each of said tracks within each of said frames and each of said single di-bits being arranged in an optimum interference pattern with respect to each of the other of said single di-bits, whereby each of said single di-bits encounters the same amount of intersymbol interference as the other of said single di-bits.

2. A method of generating a servo frequency control signal in a servo control circuit comprising the steps of:
generating an input reference signal;
generating a control signal having a first state and a second state;
generating a variable frequency oscillator signal;
generating said servo frequency control signal having a frequency determined by the difference between the frequency of said variable frequency oscillator signal and the frequency of said input reference signal when said control signal is in said first state; and
generating said servo frequency control signal having a frequency determined by the difference between the phase of said variable frequency oscillator signal and the phase of said input reference signal when said control signal is in said second state.

3. A method of generating a clocking signal for establishing a servo control system operating frequency in a servo control circuit used as part of a disk drive system for magnetically recording serial data on a disk for later recovery by a transducer comprising the steps of:
generating an input reference signal;
generating a control signal having a first state and a second state;
generating a variable frequency oscillator signal;
generating said clocking signal having a frequency determined by the difference between the frequency of said variable frequency oscillator signal and the frequency of said input reference signal when said control signal is in said first state; and
generating said clocking signal having a frequency determined by the difference between the phase of said variable frequency oscillator signal and the phase of said input reference signal when said control signal is in said second state.

4. In a disk drive system having at least one data disk, at least one transducer for magnetically recording serial data on the data disk and for later recovering the data, a servo data disk with a plurality of concentric tracks radially spaced from the center, a servo transducer and a servo data code containing a plurality of di-bits recorded on at least some of the tracks, the plurality of tracks being divided into at least two zones, one zone being a data zone, a method of generating a signal to indicate when the servo transducer is located in the data zone comprising the steps of:

recovering said servo data code from said servo data disk with said servo transducer;
generating a digital servo data signal in response to said recovered servo data code;
generating a reference signal to indicate a time domain position of said plurality of di-bits;
comparing said digital servo data signal to said reference signal; and
generating a zone detection signal wherein said zone detection signal has a first state indicating said transducer is in said data zone and a second state indicating said transducer is in a zone other than said data zone.

5. In a disk drive system having at least one data disk, at least one transducer for magnetically recording serial data on the data disk and for later recovering the data, a servo data disk with a plurality of concentric tracks radially spaced from the center, a servo data transducer, a servo data code containing a plurality of di-bits recorded on at least some of the tracks and a servo control system for positioning each of the transducers adjacent to a corresponding data disk, a method of generating a clocking signal for establishing a servo control system operating frequency comprising the steps of:

recovering said servo data from said servo data disk with said servo transducer;
generating a servo data signal in response to said recovered servo data code;
digitizing said servo data signal;
generating a lock/unlock signal having a first state and a second state;
generating an increase frequency signal and a decrease frequency signal;
generating an oscillator signal having a frequency controlled by said increase frequency signal and said decrease frequency signal;
comparing the frequency of said digitized servo data signal with the frequency of said oscillator signal when said lock/unlock signal is in said first state to generate said increase frequency signal and said decrease frequency signal;
comparing the phase of said digitized servo data signal to the phase of said oscillator signal when said lock/unlock signal is in said second state to generate said increase frequency signal and said decrease frequency signal; and
generating said clocking signal in response to said oscillator signal.

6. In a disk drive system having at least one data disk, at least one transducer for magnetically recording serial data on the data disk for later recovering the data, a servo data disk with a plurality of concentric tracks radially spaced from the center, a servo transducer, a servo data code containing a plurality of di-bits recorded on at least some of the tracks, the plurality of tracks being divided into at least two zones, one of the zones being a data zone and another of the zones being a sync/index zone containing a plurality of consecutive di-bits in at least one of said tracks, a method of generating a logic pulse to indicate the start of data is imminent comprising the steps of:

recovering said servo data from said servo data disk with said servo transducer;
generating a servo data signal in response to said recovered servo data code;
digitizing said servo data signal;

generating a plurality of reference signals indicating the time domain position of a corresponding plurality of said di-bits;

comparing said digitized servo data signal and said plurality of reference signals to generate an index pattern signal to indicate that said plurality of consecutive di-bits has been detected;

generating a lock/unlock signal having a first state and a second state;

comparing at least one of said plurality of reference signals to said index pattern signal when said lock/unlock signal is in said second state to begin generating said logic pulse signal indicating the start of data is imminent.

7. The method of generating said logic pulse as set forth in claim 6 further comprising the step of:

using said logic pulse signal to prevent generation of said index pattern signal in response to said plurality of consecutive di-bits and to begin generating a pseudo index pulse coincident in time with said logic pulse until said lock/unlock signal is in said first state.

8. In a disk drive system comprising a servo control system, a servo data disk with a plurality of concentric tracks radially spaced from the center, a servo transducer capable of being positioned at various locations over the servo data disk, a servo data code recorded on at least some of the tracks and the plurality of tracks being divided into at least two zones, one zone being a data zone, another zone being a sync/index zone containing a plurality of consecutive di-bits in at least one of the tracks, at least one data disk, a read/write data head capable of being positioned at various locations over the data disk, a method for generating a plurality of position error signals for use in controlling the location of the read/write data head comprising the steps of:

recovering said servo data from said servo data disk with said servo transducer and generating a servo data signal;

processing said servo data signal to develop an analog servo data signal having a constant amplitude and being free of unwanted frequency components;

producing a digital servo data signal in response to said servo data signal and said analog servo data signal, said digital servo data signal having a digital frequency corresponding to the frequency of said analog servo data signal;

generating a clocking signal in response to said servo data signal for establishing a servo control system operating frequency, said clocking signal having a frequency proportional to the digital frequency of said digitized servo data signal;

generating a plurality of gating signals in response to said clocking signal for indicating the time domain position of said plurality of di-bits of said servo data code;

generating a plurality of peak detected signals by demodulating said analog servo data signal in response to said plurality of gating signals; and generating said plurality of position error signals from said peak detected signals.

9. The method of recovering servo data code from said servo data disk as set forth in claim 8, further comprising the step of:

generating a data zone detected signal in response to said digitized servo data signal and at least one of said plurality of gating signals, said data zone detected signal having a first state and a second state, said first state indicating said transducer is in said data zone and said second state indicating said servo transducer is in a zone other than said data zone.

10. The method of recovering servo data code from said servo data disk as set forth in claim 8 further comprising the step of:

generating a pattern detection logic signal in response to said digital servo data signal and said plurality of gating signals to generate an index pattern signal indicating said plurality of consecutive di-bits has been detected and the start of data is imminent.

11. The method of recovering servo data code from said servo data disk as set forth in claim 8 further comprising the steps of:

generating a data zone detected signal in response to said digitized servo data signal and at least one of said plurality of gating signals, said data zone detected signal having a first state and a second state, said first state indicating said servo transducer is in said data zone and said second state indicating said servo transducer is in a zone other than said data zone; and generating a pattern detection logic signal in response to said digitized servo data signal and said plurality of gating signals to generate an index pattern signal indicating said plurality of consecutive di-bits has been detected and the start of data is imminent.

12. In a disk drive system comprising a servo control system, a servo data disk with a plurality of concentric tracks radially spaced from the center, a transducer capable of being positioned at various locations over the servo data disk, a servo data code containing a plurality of di-bits recorded on at least some of the tracks and the plurality of tracks divided into at least two zones, one zone being a data zone, at least one data disk and a read/write data head capable of being positioned at various locations over said data disk, a method for recovering the servo data code from the servo data disk and for generating a plurality of position error signals for use in controlling the location of the read/write data head, a data zone detected signal to indicate when the servo transducer is located in the data zone and a pattern detection logic signal for indicating the start of data is imminent comprising the steps of:

recovering said servo data from said servo data disk and generating a servo data signal;

processing said servo data signal to develop an analog servo data signal having a constant amplitude and being free of unwanted frequency components;

producing a digital servo data signal in response to said servo data signal and said analog servo data signal, said digital servo data signal having a frequency corresponding to said analog servo data signal;

generating a plurality of gating signals indicating the time domain position of said plurality of di-bits of said servo data;

generating a variable frequency oscillator signal;

generating a clocking signal for establishing a servo control system operating frequency whose frequency is proportional to a difference between the frequency of said variable frequency oscillator signal and the frequency of said digital servo data signal if said difference is a frequency difference above a predetermined threshold value and whose frequency is determined by a difference between the phase of said variable frequency oscillator and the phase of said digital servo data signal below said predetermined threshold value;

generating a data zone detected signal in response to said digital servo data signal and at least one of said plurality of gating signals indicating servo data is being read from a servo data zone on said servo data disk;

generating a pattern detection logic signal in response to said digital servo data signal and at least one of said plurality of gating signals indicating that the start of data is imminent;

decoding said clocking signal to create said plurality of gating signals;

demodulating said analog servo data signal in response to said plurality of gating signals to generate a plurality of peak detected signals; and generating said plurality of position error signals from said peak detected signals.

* * * * *